US010531332B2

(12) United States Patent
Agarwal et al.

(10) Patent No.: US 10,531,332 B2
(45) Date of Patent: Jan. 7, 2020

(54) VIRTUAL SWITCH-BASED CONGESTION CONTROL FOR MULTIPLE TCP FLOWS

(71) Applicant: International Business Machines Corporation, Armonk, NY (US)

(72) Inventors: Kanak B. Agarwal, Austin, TX (US); John Carter, Austin, TX (US); Wesley M. Felter, Austin, TX (US); Yu Gu, Cedar Park, TX (US); Eric J. Rozner, Austin, TX (US); Keqiang He, Madison, WI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 29 days.

(21) Appl. No.: 15/940,739

(22) Filed: Mar. 29, 2018

(65) Prior Publication Data

US 2018/0220328 A1    Aug. 2, 2018

Related U.S. Application Data

(63) Continuation of application No. 15/171,044, filed on Jun. 2, 2016, now Pat. No. 10,045,252.

(51) Int. Cl.
*H04W 28/02* (2009.01)
*H04L 12/26* (2006.01)
*H04L 12/931* (2013.01)
*H04L 12/801* (2013.01)
*H04L 12/807* (2013.01)

(52) U.S. Cl.
CPC ....... *H04W 28/0289* (2013.01); *H04L 43/026* (2013.01); *H04L 43/16* (2013.01); *H04L 47/11* (2013.01); *H04L 47/27* (2013.01); *H04L 49/70* (2013.01); *H04L 43/0894* (2013.01)

(58) Field of Classification Search
CPC ... H04L 43/026; H04L 43/0894; H04L 43/16; H04L 47/11; H04L 47/27; H04L 49/70; H04W 28/0289
See application file for complete search history.

(56) References Cited

U.S. PATENT DOCUMENTS

2008/0123676 A1* 5/2008 Cummings ........... H04L 45/742
370/419
2010/0054129 A1* 3/2010 Kuik ...................... H04L 47/10
370/235

(Continued)

OTHER PUBLICATIONS

Appendix P, 2018.

*Primary Examiner* — Jenee Holland
(74) *Attorney, Agent, or Firm* — Garg Law Firm, PLLC; Rakesh Garg; Mercedes L. Hobson

(57) ABSTRACT

At an application executing in conjunction with a vSwitch a determination is made that a first flow from a first VM is experiencing congestion. The first flow is selected for throttling. a second flow is also selected for throttling, the second flow using a portion of a network path used by the first flow in a data network. At the application, a total CWND adjustment is distributed between the first flow and the second flow. A first CWND value associated with the first flow is adjusted by a first portion of the total CWND window, and a second CWND value associated with the second flow is adjusted by a second portion of the total CWND window.

20 Claims, 11 Drawing Sheets

(56) References Cited

U.S. PATENT DOCUMENTS

| | | | | |
|---|---|---|---|---|
| 2010/0061241 | A1* | 3/2010 | Sindhu | H04L 47/10 370/235 |
| 2012/0033673 | A1* | 2/2012 | Goel | H04L 47/30 370/400 |
| 2012/0207026 | A1* | 8/2012 | Sato | H04L 12/4633 370/237 |
| 2013/0258843 | A1* | 10/2013 | Kurita | H04L 43/12 370/229 |
| 2013/0343191 | A1* | 12/2013 | Kim | H04L 47/11 370/235 |
| 2014/0082616 | A1* | 3/2014 | Kurita | G06F 9/455 718/1 |
| 2014/0201761 | A1* | 7/2014 | Dalal | G06F 13/16 718/108 |
| 2014/0301197 | A1* | 10/2014 | Birke | H04L 47/52 370/235 |
| 2014/0307554 | A1* | 10/2014 | Basso | H04L 47/2441 370/235 |
| 2014/0328340 | A1* | 11/2014 | DeCusatis | H04L 5/0032 370/389 |
| 2015/0009222 | A1* | 1/2015 | Diard | G06F 9/45533 345/505 |
| 2015/0029853 | A1* | 1/2015 | Raindel | H04L 47/127 370/235 |
| 2015/0071076 | A1* | 3/2015 | Izhak-Ratzin | H04L 47/805 370/236 |
| 2015/0124608 | A1* | 5/2015 | Agarwal | H04L 47/122 370/235 |
| 2015/0146526 | A1* | 5/2015 | Kulkarni | H04L 47/27 370/230.1 |
| 2015/0146527 | A1* | 5/2015 | Kishore | H04L 47/2441 370/230.1 |
| 2015/0163117 | A1* | 6/2015 | Lambeth | H04L 47/2441 709/224 |
| 2015/0163152 | A1* | 6/2015 | Li | H04L 47/2441 370/409 |
| 2015/0172183 | A1* | 6/2015 | DeCusatis | H04L 12/4633 370/392 |
| 2015/0200853 | A1* | 7/2015 | Kothari | H04L 45/7453 370/392 |
| 2015/0281100 | A1* | 10/2015 | Kurita | H04L 47/263 370/230 |
| 2015/0281125 | A1* | 10/2015 | Koponen | H04L 45/64 711/122 |
| 2015/0334021 | A1* | 11/2015 | Vadura | H04L 69/16 370/230 |
| 2015/0334045 | A1* | 11/2015 | Tremblay | H04L 47/783 709/226 |
| 2015/0334596 | A1* | 11/2015 | Szilagyi | H04W 28/0289 370/232 |
| 2016/0134531 | A1* | 5/2016 | Assarpour | H04L 45/74 |
| 2016/0315880 | A1* | 10/2016 | Guo | H04L 43/04 |
| 2017/0026263 | A1* | 1/2017 | Gell | G06F 16/1844 |
| 2017/0277554 | A1* | 9/2017 | Oehrlein | G06F 9/45558 |
| 2017/0302553 | A1* | 10/2017 | Zafer | H04L 41/142 |
| 2017/0311183 | A1* | 10/2017 | Cotanis | H04W 28/16 |

* cited by examiner

VIRTUAL SWITCH-BASED CONGESTION CONTROL FOR MULTIPLE TCP FLOWS

TECHNICAL FIELD

The present invention relates generally to a method, system, and computer program product for reducing data traffic congestion in data communication networks. More particularly, the present invention relates to a method, system, and computer program product for virtual switch-based congestion control for multiple TCP flows.

BACKGROUND

A data communication network, or simply, data network, facilitates data transfers between two or more data processing systems. For example, an application executing in one data processing system acts as the sender of the data, and another application executing in another data processing system acts as the receiver of the data. Between the sender system and the receiver system, the data follows a data path that comprises one or more links between networking components, such as routers and switches.

In a data processing environment, such as in a datacenter, many data processing systems are connected via a data network. At any given time, several systems may be transmitting data of various sizes to several other systems. Many of these data transmissions can utilize a common link in the network, to get from their respective sender systems to their respective receiver systems.

A data communication link in a network can become congested when more than a threshold amount of data traffic tries to use the link during a given period. The data traffic of some data flows (hereinafter, "flow", or "flows") appears in bursts, causing the data traffic on a link to spike. A link can also be over-subscribed, i.e., too many flows may try to use the link at a given time. Packet loss, increased network latency, and timeouts are some examples of problems that are caused when the utilization of a link exceeds a threshold and congestion occurs.

Some flows in a network are small flows and some are large flows. A flow that transmits less than a threshold amount of data in a given period is a small flow. A flow that transmits the threshold amount of data or more in a given period is a large flow. The data of a flow comprises packets of data. Generally, the larger the flow, the more the number of the packets therein. The packets of the various flows wanting to use a link are queued.

In many datacenters, a sending system, a receiving system, or both can be virtual machines. A virtual machine (VM) comprises virtualized representations of real hardware, software, and firmware components available in a host data processing system. The data processing system can have any number of VMs configured thereon, and utilizing any number of virtualized components therein.

For example, the host may include a processor component. One virtual representation of the processor can be assigned to one VM, and another virtual representation of the same processor can be assigned to another VM, both VMs executing on the host. Furthermore, the second VM may also have access to a virtual representation of a reserve processor in the host and certain other resources, either exclusively or in a shared manner with the first VM.

Certain data processing systems are configured to process several workloads simultaneously. For example, separate virtual data processing systems, such as separate VMs, configured on a single host data processing system often process separate workloads for different clients or applications.

In large scale data processing environments, such as in a datacenter, thousands of VMs can be operating on a host at any given time, and hundreds if not thousands of such hosts may be operational in the datacenter at the time. A virtualized data processing environment such as the described datacenter is often referred to as a "cloud" that provides computing resources and computing services to several clients on an as-needed basis.

Congestion control is a process of limiting or reducing data congestion in a section of a network, such as at a networking device or in a link. Presently, congestion control is a function of the Transmission Control Protocol/Internet Protocol (TCP/IP) stack. The TCP/IP stack is implemented by an operating system, and different operating systems implement congestion control differently. For example, one operating system might use one algorithm for performing congestion control whereas a different operating system might implement a different algorithm for the same purpose. Even a single operating system can implement different congestion control algorithms, and the ones that are implemented can be configurable to exhibit different behaviors.

SUMMARY

The illustrative embodiments provide a method, system, and computer program product. An embodiment includes a method that determines, at an application executing in conjunction with a virtual switch (vSwitch) in a host system, using a processor assigned to the vSwitch in the host system, that a first flow from a first virtual machine (VM) is experiencing congestion. The embodiment selects, at the application, the first flow for throttling. The embodiment selects, at the application, a second flow for throttling, the second flow using a portion of a network path used by the first flow in a data network. The embodiment distributes, at the application, a total congestion window (CWND) adjustment to the first flow and the second flow. The embodiment adjusts a first CWND value associated with the first flow by a first portion of the total CWND window, and a second CWND value associated with the second flow by a second portion of the total CWND window.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
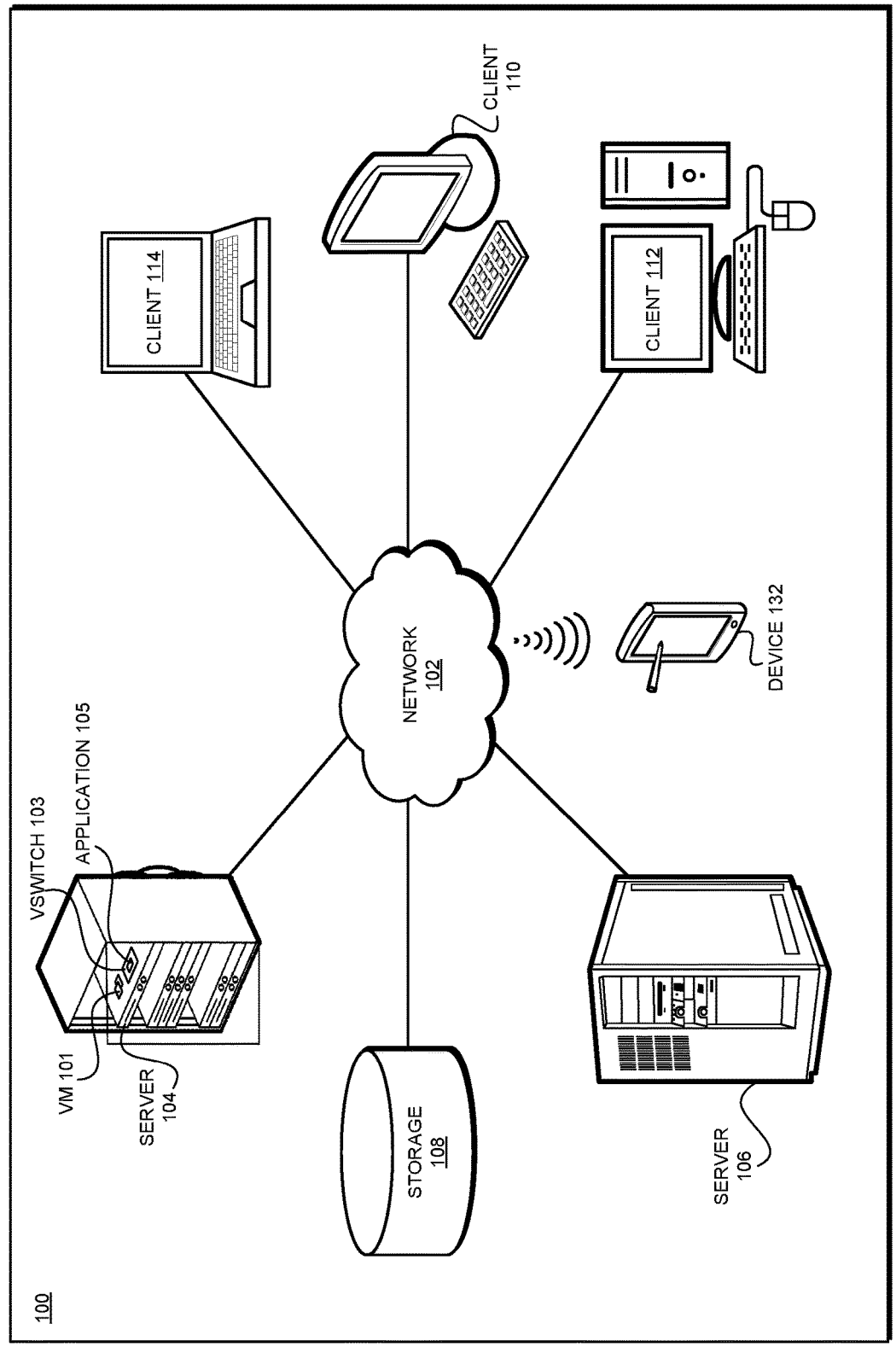
FIG. 1 depicts a block diagram of a network of data processing systems in which illustrative embodiments may be implemented.

Generally, different congestion control algorithms can produce different congestion control effects. Often, different congestion control algorithms are designed to achieve different objectives. For example, one congestion control algorithm might be configured to produce an optimal user experience from a server-based service for a client application that is operating on a client system across a wide area network (WAN). Such an algorithm is geared for reducing congestion in the WAN traffic but not necessarily in the traffic that flows between two servers of the service provider on a local area network (LAN). Another congestion control algorithm might be configured to perform congestion control on the LAN traffic and not on the WAN traffic. Another congestion control algorithm might be configured to maximize the data transmission from a particular network interface card (NIC) for a particular application using that NIC. Many different configurations of congestion control algorithms exist, and many more are possible depending upon the circumstances.

When a tenant in a datacenter operates a VM on a server, the VM may be operating on the server with other VMs, the tenant may be collocated on the server with other tenants, or a combination thereof. The illustrative embodiments recognize that because congestion control is implemented by the operating system of each VM individually, potentially each VM can be configured to perform congestion control in a manner that is most suitable for that VM.

The illustrative embodiments further recognize that the congestion control needed to operate a datacenter's data network can be different from the type and/or amount of congestion control performed by a VM executing therein. Furthermore, because of the localized nature of the presently available congestion control, a datacenter operator may not even know the type or amount of congestion control performed by the VMs operating in the datacenter.

The illustrative embodiments further recognize that changes, updates, patches, and other modifications to the TCP/IP stack can affect the congestion control function implemented therein. Not every VM may apply a patch, perform an update, or make the changes to their TCP/IP stacks. In some cases, the life of a VM may not warrant the change, whereas in other cases, an administrator of the VM may be unaware of the change or may ignore the change.

As relates to congestion control, many tenants are concerned with user experience with the data traffic that travels on the datacenter network and crosses the datacenter boundary between servers inside the datacenter and client machines outside the datacenter (also known as North-South traffic). However, the illustrative embodiments recognize that the majority of data traffic flowing over the datacenter network is actually between data processing systems within the datacenter (also known as East-West traffic). Thus, here is an example reason why a datacenter's congestion control concerns might be different from a tenant's congestion control concerns, warranting different approaches to congestion control. Many other reasons and cases exist where a datacenter's congestion control concerns might be different from a tenant's congestion control concerns, requiring different congestion control methodology to be implemented at the datacenter-level than the methodology implemented in one or more VMs operating in the datacenter.

Given the present method of congestion control, where the congestion control function is performed and controlled by the VMs, performing congestion control at a datacenter-level to achieve a datacenter's congestion control objectives is very difficult, and in many cases impossible.

Thus, the illustrative embodiments recognize that a problem exists in performing datacenter-level congestion control. The illustrative embodiments recognize that a solution is needed for this problem where the solution operates in conjunction with a VM's congestion control mechanism; by observing the VM's congestion control operation, flow, or a combination thereof; with or without the knowledge of the VM that a networking device or system in the datacenter is also operating a congestion control function; or possesses some combination of these and other features as described herein.

The illustrative embodiments used to describe the invention generally address and solve the above-described problems and other problems related to performing congestion control at the datacenter-level, outside a VM executing in the datacenter, and at a device or a system that interfaces with the datacenter network.

An embodiment can be implemented as a software application. The application implementing an embodiment can be configured as a modification of an existing virtual switch (also referred to herein as a vSwitch), as a separate application that operates in conjunction with an existing vSwitch, a standalone application, or some combination thereof. A vSwitch can also be implemented on a network interface card (NIC) in the form of software executing on the NIC and utilizing the computing resources allocated to or configured on the NIC.

A virtual switch or vSwitch is a virtual networking component that operates in a manner similar to a physical networking switch device. For example, a vSwitch determines a packet or frame's destination and provides the destination address and port-based packet/frame forwarding function to the interfaces utilizing the vSwitch. Unlike a physical switch, which is a hardware device, a vSwitch is an instantiation of a virtual object from the execution of software designed to operate in the manner of a physical switch.

As an example, one or more VMs executing on a host data processing system can be configured to interface with a vSwitch executing on the host. The vSwitch receives data packets from the interfacing VMs and sends the packets to the datacenter network with which the vSwitch also interfaces. Similarly, the vSwitch receives data packets from the datacenter network and sends the packets to the appropriate interfacing VM destination. While the VMs can be under the administrative control and configuration of one or more tenants collocated or co-hosted on the host, the vSwitch on the host is outside such VMs, outside the administrative control and configuration of the tenants, and can be administrated and configured by a datacenter administrator.

Presently, vSwitches do not perform a congestion control function. An embodiment described herein improves a vSwitch, to form an improved vSwitch, where the improved vSwitch is enabled with one or more features of the embodiment that are usable in congestion control at the datacenter-level.

Within the scope of the illustrative embodiments, a packet is outbound if the packet is directed out of a VM to a network for delivery to a destination application somewhere else on the network. Conversely, an inbound packet is a packet that is received from a network and is directed towards a destination application within the VM. In other words, an outbound packet is transmitted by the VM and an inbound packet is received by the VM.

An embodiment receives a set of inbound packets in an inbound flow (A) from the datacenter network for the VM. Inbound flow A includes packets corresponding to the packets in outbound flow F. The embodiment sends the inbound packets of flow A to the VM.

An acknowledgement packet (ACK) is a non-limiting example of an inbound packet corresponding to the outbound packet. Generally, an ACK packet is cumulative in nature, and therefore an ACK packet may acknowledge multiple outbound packets.

A congestion window (CWND) is maximum number of packets that can be transmitted over a given link without incurring a packet loss greater than a threshold amount of packet loss, a packet delivery delay greater than a threshold amount of delay, or both. For example, when the threshold amount of packet loss is set to zero and the threshold delay is set to a negligible value, the CWND is the number of packets that can be transmitted over a link without any packet loss and without any (significant) delay. Among other factors, a congestion window is dependent upon network-related conditions, including but not limited to the health of a link, the amount of traffic over the link, and a size of a packet queue at a networking device or component.

Outbound flow F takes a network path through the datacenter network to reach a specified destination. When outbound flow F experiences congestion somewhere on the network path, such as in a link included in the network path, an embodiment computes a CWND value to reduce the number of packets subsequently transmitted in flow F through the vSwitch. The CWND value is the maximum number of packets from the VM in a particular flow, e.g., flow F in the present example, that the embodiment expects to be able to transmit over the datacenter network without incurring undesirable amount of delay or packet loss.

The saved CWND is a congestion window of the vSwitch as relates to the flow from the VM. The CWND has been computed based on the flow produced by the VM according to the congestion control algorithm operating in the VM. Thus, even though unknown to the VM, the saved CWND is in coordination with the VM's congestion control algorithm, and is usable in a congestion control algorithm configured to operate in the vSwitch at the datacenter-level according to an embodiment. For example, if the CWND of the VM's congestion control algorithm is smaller than or equal to the CWND of the vSwitch, the operation of the datacenter-level congestion control will be transparent to the VM and the VM will not see any adverse effect of the datacenter-level congestion control. If the CWND of the VM's congestion control algorithm is greater than the CWND of the vSwitch, the operation of the datacenter-level congestion control will cause the VM to experience packet loss or delay, which in turn will cause the VM to shrink or reduce its own CWND.

Congestion can be determined in a variety of ways at the datacenter-level. As a non-limiting example, consider the Explicit Congestion Notification (ECN) feature used for adding path congestion information within the packets traversing a network path. An ECN-enabled sender networking component in a datacenter sets an "ECN-capable" flag in a packet passing through the sender networking component. As the packet passes other networking components on the network path to the packet destination, such other networking components add or set "congestion encountered" data bits in the packet that has the ECN-capable flag set if such other networking component in fact is experiencing congestion.

When the packet reaches the destination, if the destination is also ECN-enabled, the destination networking component echoes the ECN-related "congestion encountered" bits in the response packet. Using ACK in TCP only as a non-limiting example, in TCP ACK, when the response packet reaches the sender networking component, the sender networking component reads the ECN-related bits to determine the amount, nature, of congestion, or some combination thereof, from the congestion encountered bits. In this manner, ECN-enabled networking components can exchange congestion information using the "ECN-capable flag and ECN-related data in the congestion encountered bits.

This example of ECN-based congestion detection method is not intended to be limiting. Some additional non-limiting example methods the purposes of congestion detection in a path or a link are also described herein. Any of these or other suitable methods for determining congestion in a network path, in general, or in a link in a network path specifically, is usable with an embodiment within the scope of the illustrative embodiments.

The illustrative embodiments recognize that in some cases, when one flow encounters congestion, performing congestion control on certain other flows may be desirable. In one embodiment, a reduction is made to the CWND of all flows that share a network path, on which at least one of those flows is known to have experienced congestion. For example, flows F1, F2, . . . Fn may be n flows that are outbound from a given improved vSwitch. Suppose, as an example, that flows F1, F2, and F3 share all or a part of a common network path. If an embodiment determines that flow F1 is experiencing congestion somewhere in the network path of F1, the embodiment determines that the CWND of flows F2 and F3 should also be reduced.

Whether a flow traverses the particular network path can be determined by using any suitable method. For example, in a Software defined Network (SDN), a controller installs routes or network paths into the network. For example, the controller decides which network path the data traffic between a given sender and a given receiver will take. The controller installs, or configures, the network path between the sender and receiver accordingly. A flow occurring between the sender and the receiver then takes the configured network path to reach from the sender to the receiver. The information about these routes or network can be disseminated to an improved vSwitch according to an embodiment. The improved vSwitch uses the information about the routes to identify the flows that are using a particular network path, e.g., the network path with known congestion.

As another example, in Equal-Cost Multi-Path (ECMP) routing architecture, An ECMP set of routes or network paths is formed when a routing table contains multiple next-hop addresses for the same destination with equal cost. A network path is hashed to a hash value. As a result, an improved vSwitch participating in ECMP architecture will have the knowledge of the network topology. Using the hash value associated with a flow, the improved vSwitch can determine the network path taken by the flow in the given network topology.

Some other methods that can also provide an improved vSwitch the information usable to compute or determine a path taken by a flow include but are not limited to Source Routing where a source of a flow decides the path for the flow, and Multiprotocol Label Switching (MPLS) which directs data packets from one network node to the next based on short path labels rather than long network addresses, thereby avoiding complex lookups in a routing table.

These examples of methods for determining a path taken by a flow are not intended to be limiting. From this disclosure, those of ordinary skill in the art will be able to conceive many other similarly purposed methods and the same are contemplated within the scope of the illustrative embodiments.

In another embodiment, the embodiment identifies a specific link that is congested in the shared network path. The embodiment identifies those flows that are using the same congested link. For example, flows F1, F2, . . . Fn may be n flows that are outbound from a given improved vSwitch. Suppose, as an example, that flows F1, F4, and F5 all use a specific link of a common network path. If an embodiment determines that flow F1 is experiencing congestion in that link of F1, the embodiment determines that the CWND of flows F4 and F5 should also be reduced. Note that even if F2 and F3 are sharing some other portion of the network path with F1, if F2 and F3 do not use the congested link—as in this example—the embodiment does not reduce the CWND of F2 and F3 due to the reason that F1 faces congestion in the congested link.

Any suitable method for link identification can be used in conjunction with an embodiment. For example, a probing method sends an arbitrary probe packet throughout the network. A series of probes could be sent such that they only share one link. A specific link can be targeted by a set of probes in this manner and congestion can be measured on that link if all the probes sent to share that link experience higher than a threshold amount of delay. Alternatively, with an implementation of OpenFlow—a SDN technology—a centralized controller can insert an arbitrary packet into a selected network link and then measure the delay of traversing the link. A delay that exceeds a threshold is an in indicator that the link may be congested.

As another example, Quantized Congestion Notification (QCN) is a method for end-to-end congestion notification in data center networks. QCN can be enabled in the network to provide end-to-end congestion notification for layer 2 networks. For QCN to be effective, it must be enabled on the entire data path throughout the network.

QCN Congest Notification (CN) packets are sent from a switch to an end-point when congestion occurs. Switches that support QCN can notify end hosts, which must also support QCN, about the presence of congestion in the network. The end hosts can then respond by reducing their traffic transmission, helping alleviate the upstream congestion.

Sampling from the networking components is another example method for congested link detection. In packet sampling, when a switch determines there is congestion, the vSwitch may mark a packet with that information. The method matches the packets that experience the congestion and then, as an action, send the packet to a centralized controller (or a vSwitch). The controller may get many of these matched packets for even a single packet from a single flow because a congestion bit will get set in the network and then continue to be set throughout the rest of the path the packet traverses. The controller/vSwitch can use the first instance of the bit that is set to locate the bottleneck link. An alternative method could just sample packets from the switches on the path and then try to find the first instance where congestion was encountered.

These example methods for congested link detection are not intended to be limiting on the illustrative embodiments. Any suitable method for identifying a congested link in a given network is similarly usable in combination with an embodiment, and such combinations are contemplated within the scope of the illustrative embodiments.

Thus, some embodiments throttle, i.e., reduce the CWND of, all flows that share any part of a network path on which congestion has been detected somewhere, and some embodiments throttle only those flows that share the actual identified congested link. To perform the throttling an embodiment can employ different methodologies to determine how much to throttle a flow, i.e., how much should the flow's CWND be reduced.

As an illustrative non-limiting example, suppose that congestion is detected in flow F1 flowing through an improved vSwitch. In one example method for computing an amount of throttling according to an embodiment, the embodiment determines that a reduction of x packets, i.e., reducing the CWND of F1 by x number of packets per period, is justified. Assume that Fn, Fm, and Fp are three other flows amongst any number of other flows flowing through the vSwitch. Assume that Fn, Fm, and Fp are selected for throttling along with F1 due to any of the reasons described herein. Instead of applying the entire reduction of x packets to F1, the embodiment distributes the reduction of x packets evenly or nearly evenly across flows F1, Fn, Fm, and Fp. For example, if x=8, instead of reducing the CWND of flow F1 by 8, the method of the embodiment reduces the CWND associated with each of flows F1, Fn, Fm, and Fp—a total of 4 flows—by 8/4=2 packets. If x=9, the embodiment may reduce the CWND of F1, Fn, and Fm by 2 each, and the CWND of Fp by the remaining amount=3 in a near even distribution.

In another example method for computing an amount of throttling according to another embodiment, the embodiment determines that a reduction of x packets, i.e., reducing the CWND of F1 by x number of packets per period, is justified. Assume that the present CWND of F1 is y. The reduction amounts to x/y fraction of the current CWND value. Assume that Fn, Fm, and Fp are three other flows amongst any number of other flows flowing through the vSwitch. Assume that Fn, Fm, and Fp are selected for throttling along with F1 due to any of the reasons described herein. The embodiment reduces the CWND of flows F1, Fn, Fm, and Fp by x/y fraction as well. For example, if x=8, and y=24, x/y is a reduction of the CWND by ⅓rd. Thus, the method of the embodiment reduces the CWND associated with each of flows F1, Fn, Fm, and Fp by ⅓rd. For example, existing CWND of F1 is reduced from 24 to 24−(24/3)=16, existing CWND of Fn is reduced from 30 to 30−(30/3)=20, existing CWND of Fm is reduced from 21 to 21−(21/3)=14, existing CWND of Fp is reduced from 60 to 60−(60/3)=40. Generally, according to this method, the fraction may or may not depend on x, and any fraction reduction applied to the CWND of one selected flow is applied to all other selected flows.

In another example method for computing an amount of throttling according to another embodiment, the embodiment determines that a reduction of x packets, i.e., reducing the CWND of F1 by x number of packets per period, is justified. Assume that Fn, Fm, and Fp are three other flows amongst any number of other flows flowing through the vSwitch. Assume that Fn, Fm, and Fp are selected for throttling along with F1 due to any of the reasons described herein. The embodiment reduces the CWND of flows F1, Fn, Fm, and Fp by a weighted fraction. The weight of a selected flow F1, Fn, Fm, or Fp, can be configured in any suitable manner without departing the scope of the illustrative embodiments. In one example weighting scheme, the weight of a selected flow depends on the bandwidth usage by that flow. For example, suppose that F1 is using 10 percent, Fn is using 20 percent, Fm is using 30 percent, and Fp is using 40 percent of the bandwidth corresponding to the shared network path or a link thereof, depending on the selection criteria. Suppose that x=10. Thus, the method of the embodiment reduces the CWND associated with F1 by 10% of 10=1, Fn by 20% of 10=2, Fm by 30% of 10=3, and Fp by 40% of 10=4. The total reduction of x=10 is thus achieved by weighted reduction of the CWNDs of each selected flow (1+2+3+4=10).

These methods for determining an amount of throttling to be applied to each of the selected flows are not intended to be limiting on the illustrative embodiments. From this disclosure, those of ordinary skill in the art will be able to compute the amounts of throttling to be applied to each selected flow in other ways as well, and such other computations are contemplated within the scope of the illustrative embodiments. For example, the weighted reduction may be according to a priority associated with the flow instead of the flow's bandwidth usage. As some other examples, the weighted reduction may be according to a flow parameter associated with the flow; the reduction fraction may be weighted according to any suitable weighting factor; the reduction can be applied on a round-robin basis to the selected flows; and many other variations.

A set of flow parameters describes a characteristic related to a flow. For example, a flow parameter may be a destination identifier in a packet in the flow. The priority of the flow and the bandwidth used by the flow are also examples of flow parameters. Some other example flow parameters include but are not limited to a priority of a process generating the flow, a level of operation or performance associated with the flow or a source application of the flow, a rule or policy affecting the flow or related to an aspect of the flow, a time of the occurrence of the flow, and the like. These examples of flow parameters are not intended to be limiting. From this disclosure, those of ordinary skill in the art will be able to conceive many other flow parameters that are usable in a manner described herein, and the same are contemplated within the scope of the illustrative embodiments.

A receiver advertised window (RWND) is the maximum number of packets that a particular receiver of a particular flow can successfully receive in the flow without dropping a greater than a threshold number of packets, without requiring retransmission of a greater than another threshold number of packets, or both. For example, when the threshold number of dropped packets is set to zero and the threshold number of packet requiring retransmission is set to zero, the RWND is the number of packets that the receiver can receive in a flow without dropping any packets and without requiring any packets to be retransmitted. Among other factors, RWND is dependent upon receiver-related conditions, including but not limited to the receive rate of which the configuration of the receiver is capable, and a size of a packet queue at a networking device or component associated with the receiver.

A VM's congestion control algorithm can read the RWND populated in an inbound packet received from a receiver in response to a previously transmitted outbound packet. RWND is used in a logically separate process known as flow control. The congestion control process sets the CWND value. The flow control process sets the RWND value. The sending operation of a sender's TCP/IP stack is then bound by these two independent processes, to wit, the minimum of CWND and RWND: min(RWND, CWND).

An embodiment executing in a vSwitch computes a CWND that is applicable to a selected group of flows in the manner described herein. Different selected flows can potentially originate in different VMs that interface with the improved vSwitch. Thus, a CWND reduction computed at the vSwitch for a particular selected flow can be communicated to the VM that corresponds to that flow by adjusting or replacing the RWND in an inbound packet targeted at that VM.

For a particular selected flow in a group of flows selected for throttling, an embodiment enforces the vSwitch-computed CWND, to wit, the reduced CWND for that flow, as the upper limit on the number of packets that the corresponding VM should send to the vSwitch. To accomplish this enforcement, the embodiment identifies, in an inbound packet corresponding to the selected flow, the RWND value populated by a sender of the inbound packet (a receiver from the perspective of the VM of the selected flow). The embodiment overwrites the RWND value in the inbound packet with the vSwitch-computed reduced CWND value for the selected flow. The embodiment sends the thus-modified inbound packet to the VM corresponding to the selected flow. The CWND corresponding to each selected flow can be adjusted in this manner.

Now, when the VM of a selected flow reads the RWND value from the modified inbound packet corresponding to that flow, the VM will find the vSwitch-computed reduced CWND value for that flow. Thus, if the VM uses the RWND value as the upper bound for the number of packets to transmit to the vSwitch, the number will be bound by the reduced CWND value without the VM's knowledge that the number actually comes from the vSwitch and not the receiver. This modification of the packet does not require any change in the operation of the VM, and the VM remains unaware of the datacenter-level congestion control being performed in this manner.

One vSwitch operating in a datacenter network can communicate with another vSwitch operating in the datacenter network. For example, if the vSwitches are operating in an SDN-type datacenter network, the a vSwitch can communicate a message to the SDN controller and the SDN controller can propagate the message to other vSwitches in the SDN. A monitoring system can facilitate messaging between vSwitches in another network architecture used in the datacenter network. vSwitches may themselves be enabled in other ways to communicate with one another in a given data network, such as by employing a backchannel through the datacenter network. These example methods of communication between vSwitches are not intended to be limiting on the illustrative embodiments. Generally, any method that enables one vSwitch to communicate with another vSwitch in a given datacenter network is contemplated within the scope of the illustrative embodiments.

Using an available communication method for inter-vSwitch communication, a vSwitch that detects congestion in a flow can communicate the information about that congestion to one or more other vSwitches operating in the datacenter network. For example, suppose that an improved vSwitch detects congestion in a path or a specific link that is used by a local flow of the improved vSwitch. A local flow is a flow processed by the vSwitch. According to another embodiment, the improved vSwitch notifies another vSwitch about the congested path or link.

For example, if operating in an SDN, the improved vSwitch notifies an SDN controller, which in turn notifies one or more other improved vSwitches, e.g., by network-wide broadcasting of the congestion information. As another example, if a monitoring system or other inter-vSwitch communication facility is available to the improved vSwitch, the improved vSwitch can notify one or more other improved vSwitches of the congestion using such a facility. as another example, the monitoring system and/or controller can detect congestion by any suitable method available to the monitoring system or controller, and then the monitoring system or controller can notify the appropriate vSwitches of the congestion. As another example, the vSwitch/router could notify those vSwitches whose local flows traverse a congested link or path.

Regardless of how the notification is performed, one improved vSwitch notifies another improved vSwitch that the first improved vSwitch has detected congestion in a network path generally, or in a link specifically. When the second improved vSwitch receives such a notification, the second improved vSwitch can examine its own local flows to determine whether any of its local flows are using that congested path or link.

If the second improved vSwitch finds that one or more of its local flows, i.e. a subset of a set of the second improved vSwitch's local flows, are using the path or link that is reported as congested according to the notification from the first improved vSwitch, the second improved vSwitch can appropriately throttle that subset of the local flows by using an embodiment described herein.

The notification to a vSwitch can optionally contain additional information. For example, vSwitch 1 could send data to vSwitch 2 that not only identifies a link or path that is congested, but also which (or how many) flows are impacted by the congestion at vSwitch 1. This additional information may help vSwitch 2 select a suitable technique for CWND reduction over multiple flows as described herein. Alternatively, the SDN controller or monitoring framework (or switch) can collect the information about the sets of local flows at their respective vSwitches, and send the collected information to other vSwitches in the network. A vSwitch receiving such a collection of information thus becomes a part of multi-flow CWND reduction over a distributed set of vSwitches.

A method of an embodiment described herein, when implemented to execute on a device or data processing system, comprises substantial advancement of the functionality of that device or data processing system towards performing datacenter-level congestion control. For example, presently available methods for congestion control are implemented by the operating system and are therefore local to the machine where the operating system executes, such as local to a VM. An embodiment provides a method by which vSwitches can be modified to perform datacenter-level congestion control by throttling multiple flows as a result of detecting congestion in one flow. The multiple flows share at least a part of a network path that is used by the flow where congestion is detected. Furthermore, the datacenter-level congestion control can be performed according to an embodiment without requiring any change in the VMs communicating with the improved vSwitches or even without the VMs becoming aware that congestion control is being performed at the datacenter-level. Furthermore, a notification about a congestion detected by one improved vSwitch can enable other vSwitches to examine their own local flows for throttling in response to that congestion. This manner of virtual switch-based congestion control for multiple TCP flows at one or more vSwitches is unavailable in the presently available methods. Thus, a substantial advancement of such devices or data processing systems by executing a method of an embodiment is in allowing datacenters to manage congestion in datacenter networks without relying on the congestion control functions implemented in tenant VMs.

The illustrative embodiments are described with respect to certain types of packets, flows, flow parameters, VMs, vSwitches, CWND values, RWND values, normalized values, features, priorities, congestion control operations, congestion control algorithms, types of congestion control algorithms, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
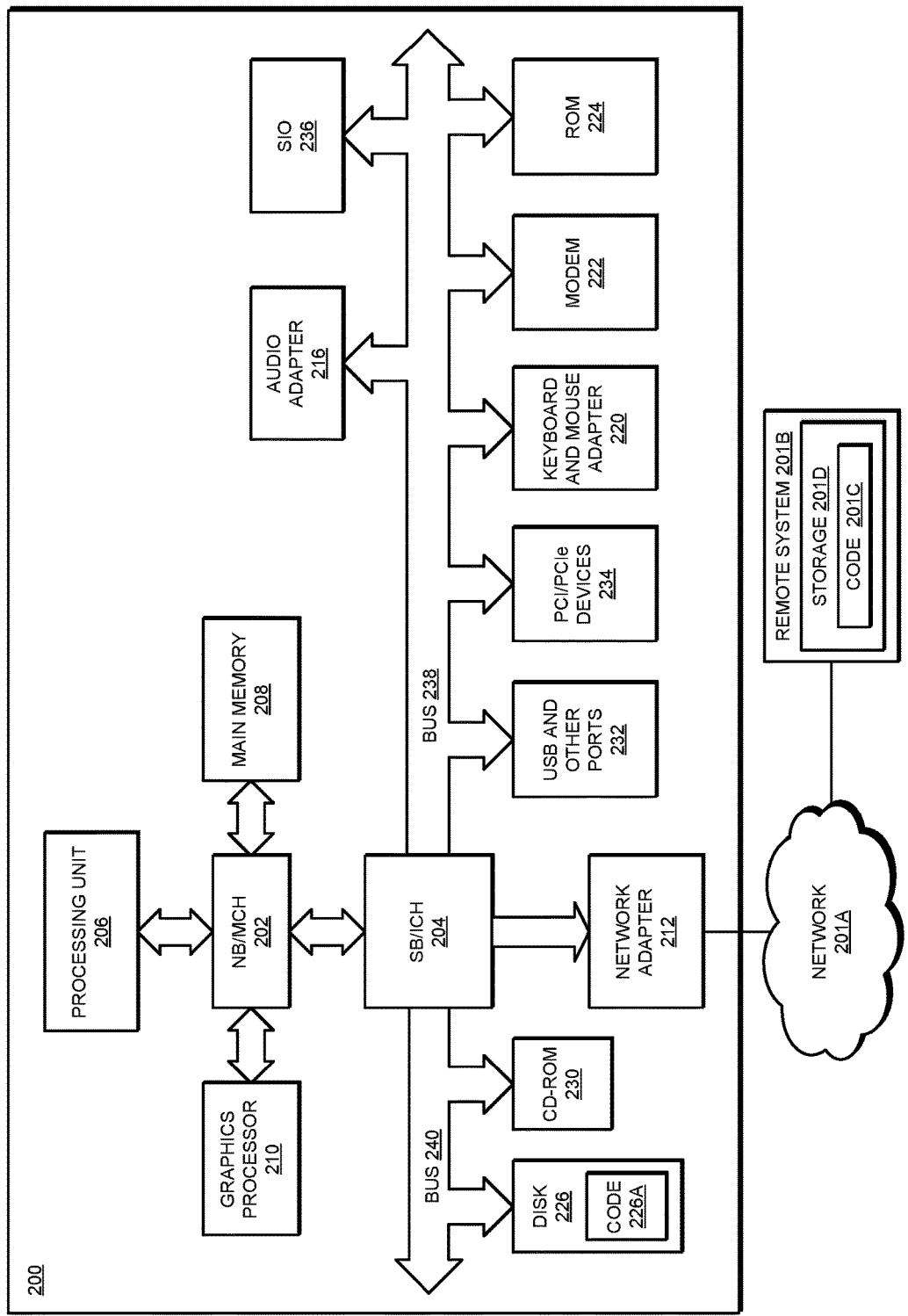
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

VM 101 is one or more VMs executing in server 104. An instance of VM 101 may send one or more flows to vSwitch 103. Any number of instances of VM 101 may send any number of flows to vSwitch 103 in a similar manner. VSwitch 103 is an existing vSwitch implemented in server 104. Application 105 implements an embodiment in vSwitch 103, making the combination of application 105 and vSwitch 103 an improved vSwitch as described herein. Application 105 operates in conjunction with vSwitch 103 to effectively form an improved vSwitch which can provide a function of an embodiment described herein. Network 102 can be regarded as a datacenter network, which is usable for, for example, data communication between vSwitch 103 in server 104 and another vSwitch (not shown) in server 106. Different flows—whether from the same instance of VM 101 or different instances of VM 101 may take different network paths through network 102.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
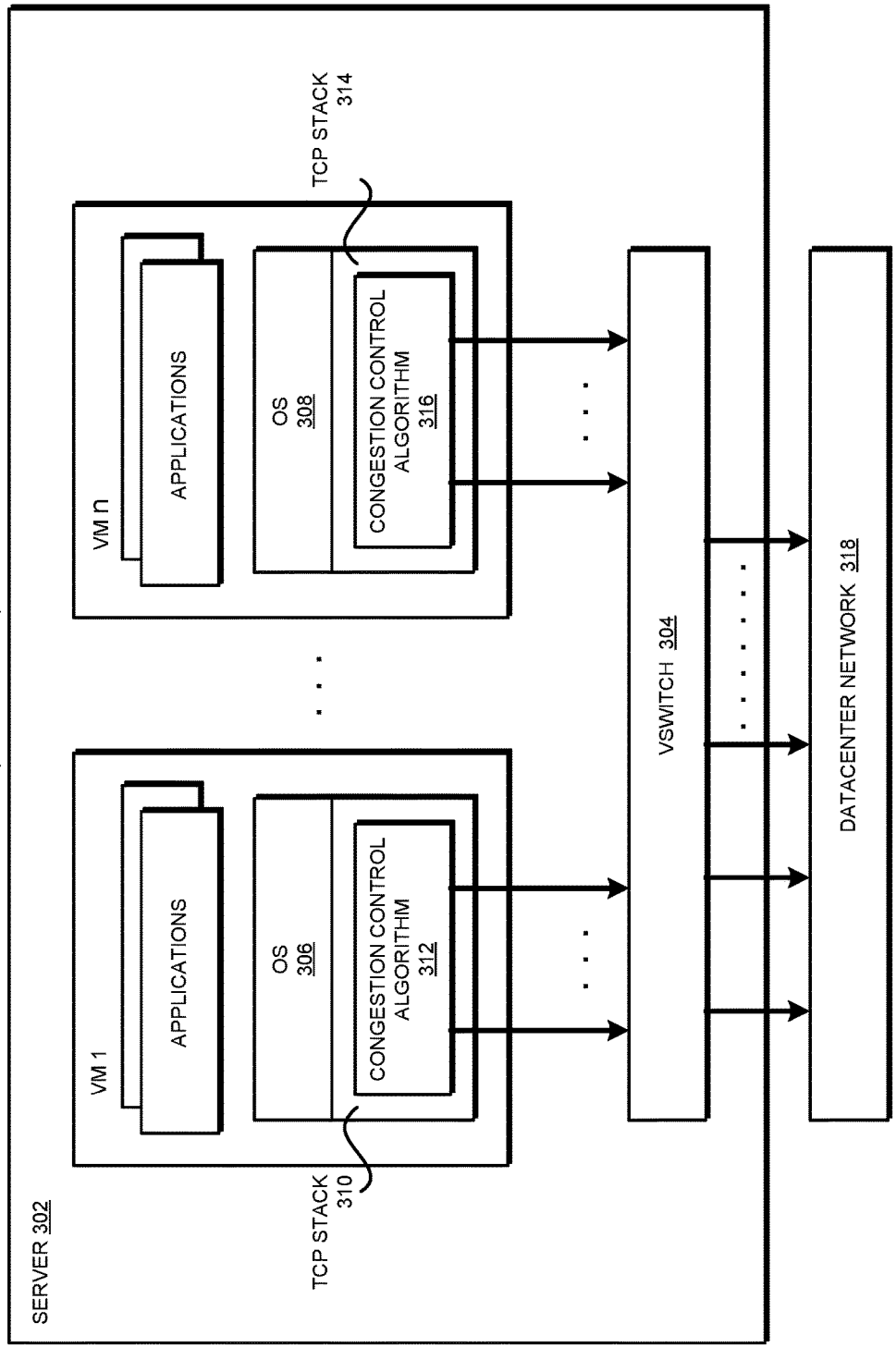
FIG. 3 depicts a block diagram of an example configuration for data communication using a vSwitch in a datacenter environment which can be improved with an illustrative embodiment.

With reference to FIG. 3, this figure depicts a block diagram of an example configuration for data communication using a vSwitch in a datacenter environment which can be improved with an illustrative embodiment. Server 302 is an example of server 104 in FIG. 1. VSwitch 304 is an example of vSwitch 103 in FIG. 1. VM1-VMn are each an example of VM 101 in FIG. 1.

Each VM operates under the control of a corresponding operating system and executes one or more application thereon. For example, VM1 includes operating system 306 and VMn includes operating system 308. Operating system 306 implements TCP/IP stack 310 in VM1, which executes congestion control algorithm 312 for managing the data flows originating from VM1. In a similar manner, operating system 308 implements TCP/IP stack 314 in VMn, which executes congestion control algorithm 316 for managing the data flows originating from VMn.

Datacenter network 318 is an example of network 102 in FIG. 1. The data flows from VM1-VMn in server 302 are sent to vSwitch 304, which directs the data flows to datacenter network 318, which connects server 302 to other servers in the datacenter. The flows reaching datacenter network 318 in this manner are under the congestion control of their respective VMs, particularly under the control of the congestion control algorithms executing in their respective VMs. The flows reaching datacenter network 318 in this manner cause problems in datacenter-level congestion control, as described herein.

Figure 4:
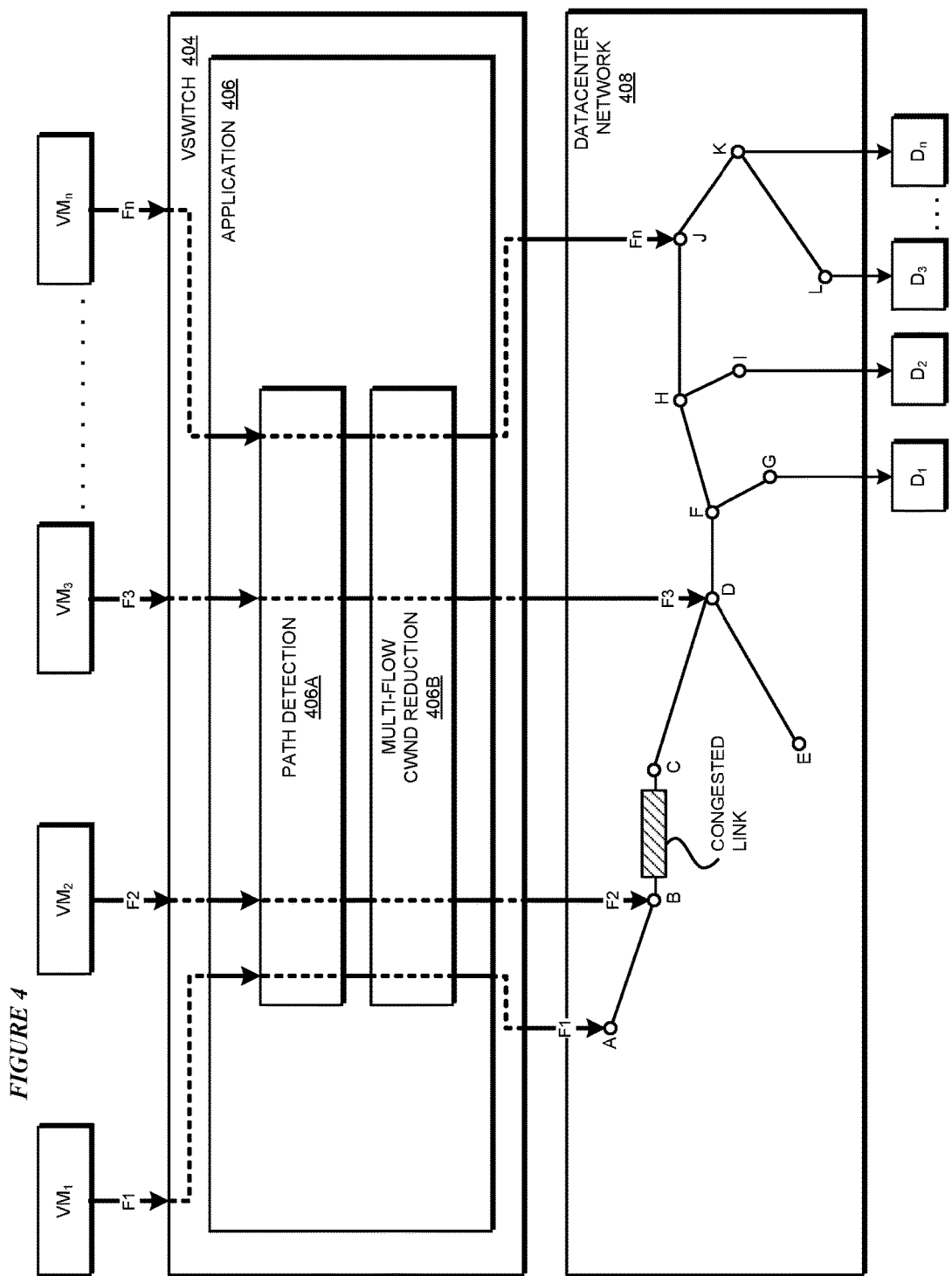
FIG. 4 depicts a block diagram of a configuration for virtual switch-based congestion control for multiple TCP flows in accordance with an illustrative embodiment.

With reference to FIG. 4, this figure depicts a block diagram of a configuration for virtual switch-based congestion control for multiple TCP flows in accordance with an illustrative embodiment. VSwitch 404 is an example of vSwitch 304 in FIG. 3. Application 406 is an example of application 105 in FIG. 1. VSwitch 404 enabled by application 406 forms an improved vSwitch as described and used herein. Datacenter network 408 is an example of datacenter network 318 in FIG. 3.

VM1 is an example of VM1 in FIG. 3. Any number of such VMs may be coupled with vSwitch 404 in a similar manner. F1 is an outbound flow from VM1, F2 is an outbound flow from VM2, F3 is an outbound flow from VM3, and so on. Similarly, Fn is an outbound flow from VMn.

Without implying a one-VM-one-flow limitation, a single flow is depicted from a VM only for the clarity of the depiction and description. Application 406 receives flows F1 from VM1, F2 from VM2 F3 from VM3, . . . and Fn from VMn. In operation 406A, application 406 detects a path where congestion is indicated for a flow in flows F1-Fn. Further in operation 406A, application 406 identifies a subset of flows F1-Fn that use at least a portion of the path with the congestion. In operation 406B, application 406 determines a total throttling amount, i.e., a total reduction in an overall CWND of vSwitch 404 which applies to the path with the congestion. This total throttling amount is the multi-flow CWND reduction, which is to be distributed amongst the subset of flows that use at least a portion of the path with the congestion. Application 406 allows flow F1 to proceed to datacenter network 408.

For example, suppose that datacenter network 408 is configured with networking components A, B, C, D, E, F, G, H, I, J, K, and L. D1, D2, D3, . . . and Dn represent destinations or receivers of Flows F1, F2, F3, . . . and Fn, respectively. In the depicted non-limiting example, flow F1 takes network path ABCDFG to D1; flow F2 takes network path BCDFHI to D2; flow F3 takes network path DFHJKL to D3; . . . and flow Fn takes network path JK to Dn.

Suppose that congestion is detected and first indicated for flow F1 in the path taken by F1. As can be seen, the network paths taken by F1, F2, and F3 have some commonalities in that those network paths share at least some common portions of one or more links in datacenter network 408. For example, F1 and F2 share BCDF portion, F1 and F3 share DF portion.

Therefore, a selected subset of flows to which throttling should be applied includes flows F1, F2, and F3. Suppose congestion exists in link BC in datacenter network 408. According to some embodiments, even though F3 does not use congested link BC, but because F3 shares some portion of its path with the path of F1, F3 is included in the selected subset of flows and is throttled.

Figure 5:
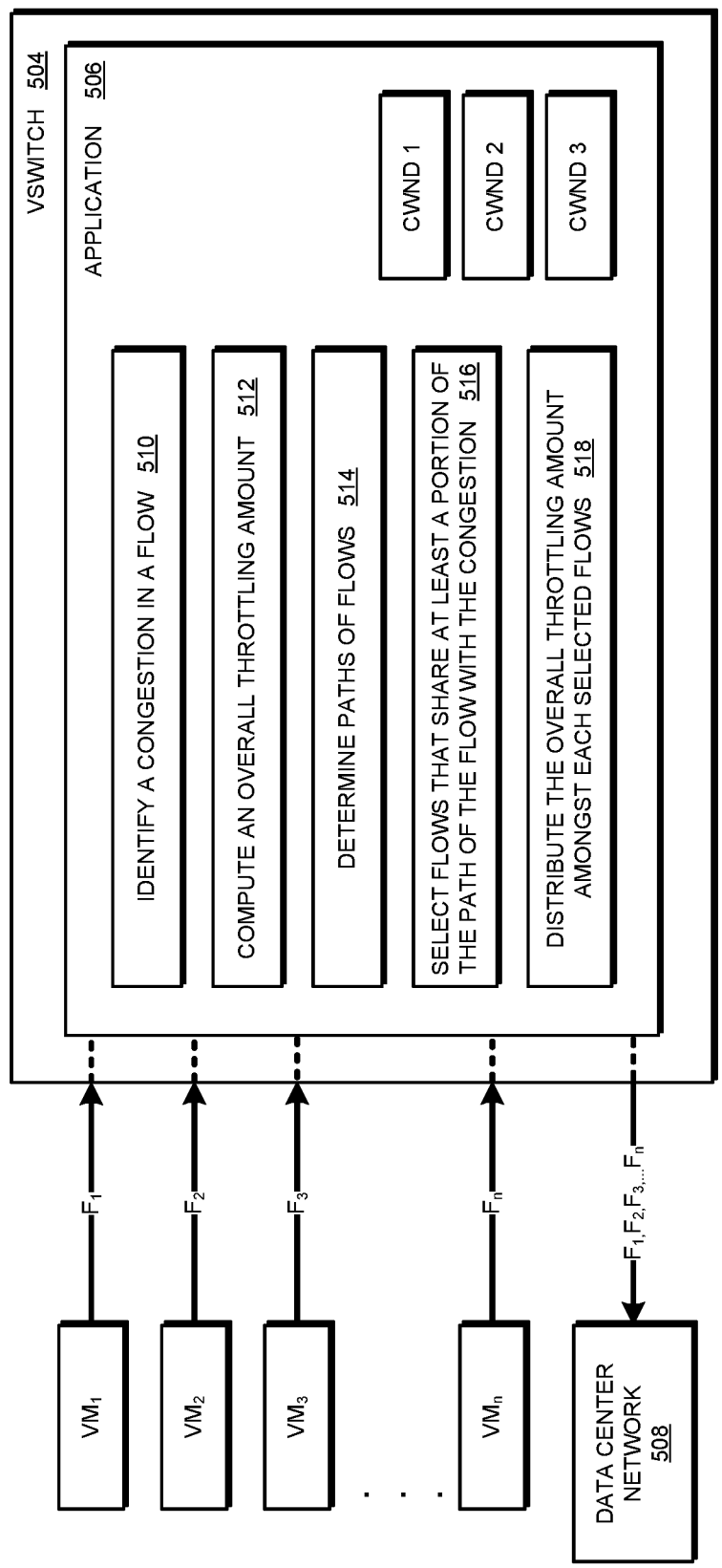
FIG. 5 depicts a block diagram of one example configuration for distributing an overall throttling value to multiple flows that share at least a portion of a congested network path in accordance with an illustrative embodiment.

With reference to FIG. 5, this figure depicts a block diagram of one example configuration for distributing an overall throttling value to multiple flows that share at least a portion of a congested network path in accordance with an illustrative embodiment. vSwitch 504 is an example of vSwitch 404 in FIG. 4. Application 506 is an example of application 406 in FIG. 4. vSwitch 504 enabled by application 506 forms another improved vSwitch as described and used herein. Datacenter network 508 is an example of datacenter network 408 in FIG. 4. VM1-VMn are configured to send flows F1-Fn through vSwitch 506 in a manner substantially similar to the depiction and description of FIG. 4. FIG. 5 is also described with respect to the example depicted in FIG. 4.

Component 510 determines a congestion in the path of a flow. For example, using any congestion detection method described herein component determines that congestion exists in the network path taken by F1 as in the example depiction of FIG. 4. Component 512 computes an overall throttling amount that would be sufficient to reduce the congestion to an acceptable level.

Component 514 determines the paths taken by other flows, e.g., by flows F2-Fn. Component 516 selects those flows that share at least a portion of the path of the flow with the congestion. In the above example, component 516 selects a subset of flows F1-Fn which share at least a portion of the path of flow F1. The subset includes F1, F2, and F3 according to the example depicted in FIG. 4.

Component 518 distributes the overall throttling amount amongst the flows selected in the subset. For example, using any distribution method described or referred to herein, or other similarly purposed methods, component 518 computes CWND1 for applying to F1, CWND2 for applying to F2, and CWND3 for applying to F3. Thereafter, when vSwitch 504 directs flow F1 to datacenter network 508, vSwitch 504 throttles or reduces F1 packets according to a CWND window that is reduced by CWND1 amount. Similarly, when vSwitch 504 directs flow F2 to datacenter network 508, vSwitch 504 throttles or reduces F2 packets according to a CWND window that is reduced by CWND2 amount; and when vSwitch 504 directs flow F3 to datacenter network 508, vSwitch 504 throttles or reduces F3 packets according to a CWND window that is reduced by CWND3 amount.

Note that the throttling can be effective for a predetermined duration, can be dynamically recomputed and adjusted on an ongoing basis depending upon the congestion increasing or decreasing due to the throttling and/or other factors, can be dynamically recomputed and adjusted on an ongoing basis depending upon a previously selected flow ceasing using a shared portion or a new flow beginning to use a portion of the congested path, or applied using some combination thereof.

Figure 6:
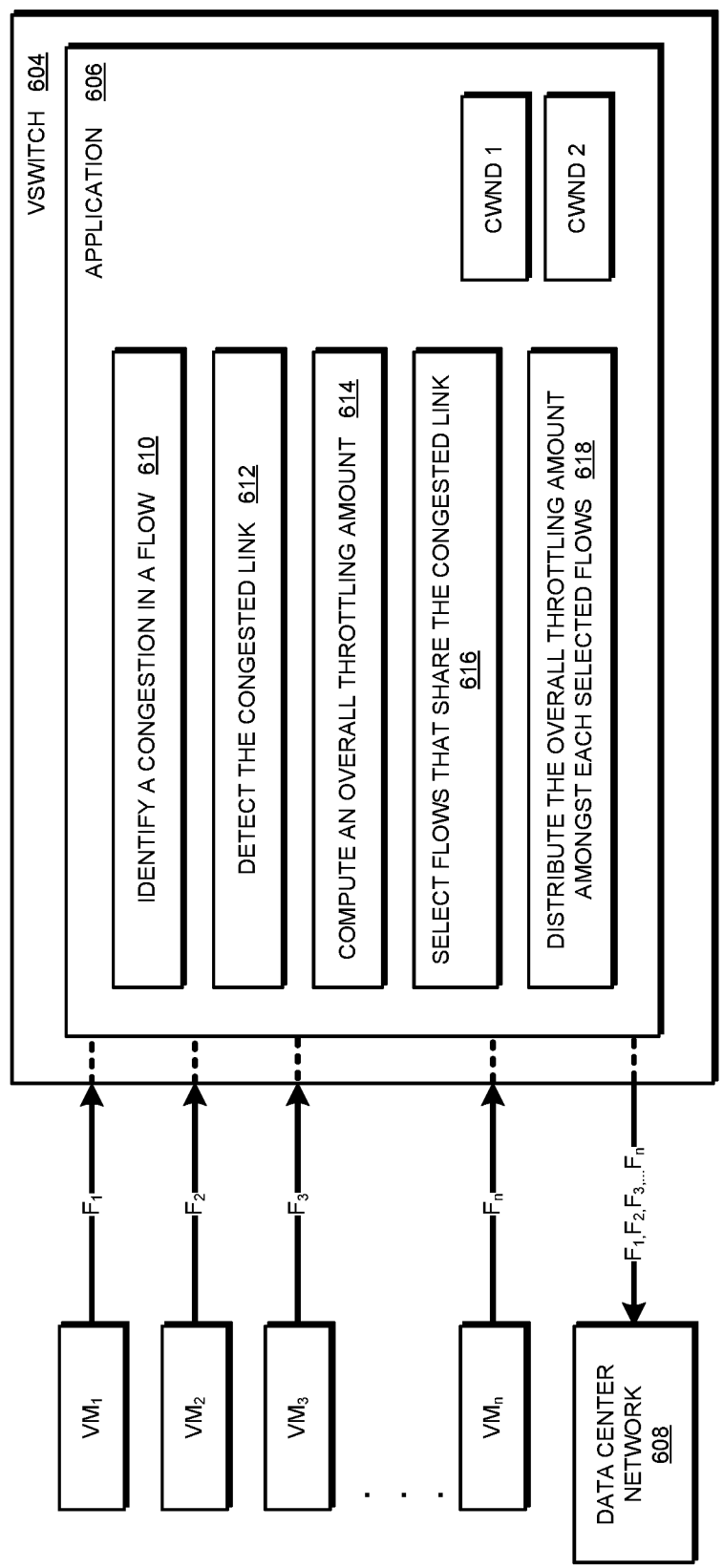
FIG. 6 depicts a block diagram of one example configuration for distributing an overall throttling value to multiple flows that share at least a congested link in accordance with an illustrative embodiment.

With reference to FIG. 6, this figure depicts a block diagram of one example configuration for distributing an overall throttling value to multiple flows that share at least a congested link in accordance with an illustrative embodiment. vSwitch 604 is an example of vSwitch 404 in FIG. 4. Application 606 is an example of application 406 in FIG. 4. vSwitch 604 enabled by application 606 forms another improved vSwitch as described and used herein. Datacenter network 608 is an example of datacenter network 408 in FIG. 4. VM1-VMn are configured to send flows F1-Fn through vSwitch 606 in a manner substantially similar to the depiction and description of FIG. 4. FIG. 6 is also described with respect to the example depicted in FIG. 4.

Component 610 determines a congestion in the path of a flow. For example, using any congestion detection method described herein component determines that congestion exists in the network path taken by F1 as in the example depiction of FIG. 4. Component 612 identifies a particular link that is congested in the network path. For example, component identifies link BC to be congested in datacenter network 408 in FIG. 4.

Component 614 computes an overall throttling amount that would be sufficient to reduce the congestion to an acceptable level. Component 616 determines the paths taken by other flows, e.g., by flows F2-Fn, and selects those flows that share the congested link. In the example of FIG. 4, component 616 selects a subset of flows F1-Fn which share link BC. This subset, as different from the subset selected in FIG. 5, includes F1 and F2, but not F3 according to the example depicted in FIG. 4.

Component 618 distributes the overall throttling amount amongst the flows selected in the subset. For example, using any distribution method described or referred to herein, or other similarly purposed methods, component 618 computes CWND1 for applying to F1 and CWND2 for applying to F2.

Thereafter, when vSwitch 604 directs flow F1 to datacenter network 608, vSwitch 604 throttles or reduces F1 packets according to a CWND window that is reduced by CWND1 amount. Similarly, when vSwitch 604 directs flow F2 to datacenter network 608, vSwitch 604 throttles or reduces F2 packets according to a CWND window that is reduced by CWND2 amount. Flow F3 is not throttled in the configuration of FIG. 6 on the example depiction of FIG. 4.

As with the configuration of FIG. 5, when using the configuration of FIG. 6, the throttling can be effective for a predetermined duration, can be dynamically recomputed and adjusted on an ongoing basis depending upon the congestion increasing or decreasing due to the throttling and/or other factors, can be dynamically recomputed and adjusted on an ongoing basis depending upon a previously selected flow ceasing using a shared portion or a new flow beginning to use a portion of the congested path, or applied using some combination thereof.

Figure 7:
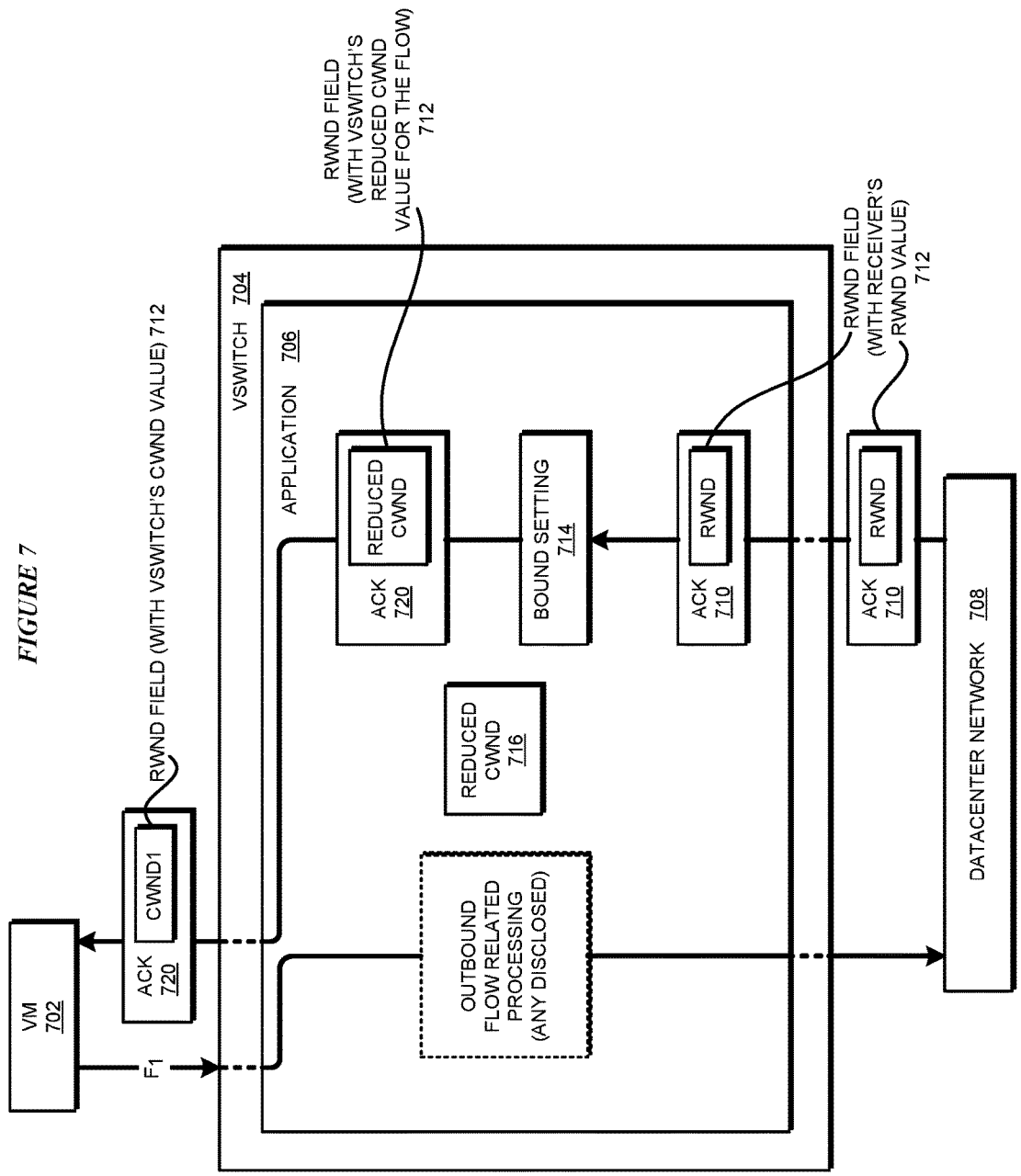
FIG. 7 depicts a block diagram of an example configuration for enforcing datacenter-level congestion control in accordance with an illustrative embodiment.

With reference to FIG. 7, this figure depicts a block diagram of an example configuration for enforcing datacenter-level congestion control in accordance with an illustrative embodiment. VSwitch 704 can be an example of vSwitch 103 in FIG. 1, vSwitch 404 in FIG. 4, vSwitch 504 in FIG. 5, or vSwitch 604 in FIG. 6, depending on how and which features are implemented in a given implementation. Similarly, application 706 can be an example of application 105 in FIG. 1, application 406 in FIG. 4, application 506 in FIG. 5, or application 606 in FIG. 6, depending on how and which features are implemented in a given implementation. VSwitch 704 enabled by application 706 forms another improved vSwitch as described and used herein.

VM 702 sends outbound flow F1 to vSwitch 704. Application 706 may, but need not apply one or more operations described herein to flow F1 before sending flow F1 to datacenter network 708.

As an example, assume that vSwitch 704 receives response packet 710 corresponding to a packet in F1. Further assume only as a non-limiting example, that response packet 710 is an ACK packet. As described herein, the sender of packet 710 (a receiver from VM 702's perspective) may provide an RWND value in location or field 712 in packet 710.

Application 706 implements operation 714. Operation 714 sets an upper bound on the number of packets VM 702 can transmit to vSwitch 704 in a future flow F1. In one implementation, CWND1 of FIG. 5 or FIG. 6, as the case may be, is a reduction to a previously set CWND upper bound, the reduced value being applicable to F1 at vSwitch 704. A new and reduced value of the CWND that is now applicable to F1 at vSwitch 704 can be calculated by subtracting the CWND1 value from the previous CWND value. In another implementation, CWND1 of FIG. 5 or FIG. 6, as the case may be, is a new and reduced value of a previously set CWND upper bound, the reduced value being now applicable to F1 at vSwitch 704.

Particularly, operation 714 overwrites the RWND value in field 712 with the new and reduced CWND value 716, which is vSwitch 704's new and reduced CWND value for flow F1. The rewriting or overwriting of field 712 produces modified response packet 720. Application 706 sends packet 720 to VM 702.

Figure 8:
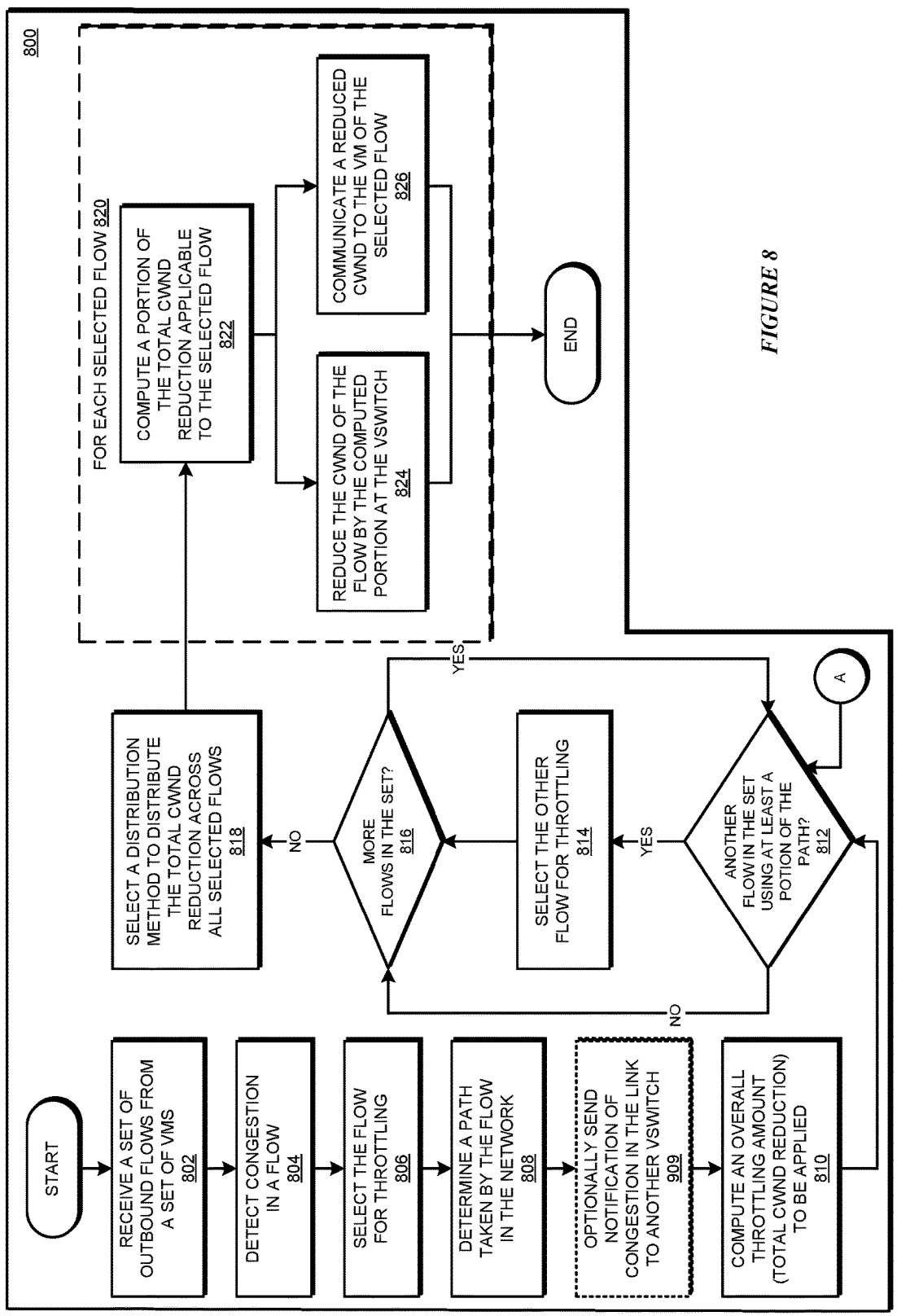
FIG. 8 depicts a flowchart of an example process for virtual switch-based congestion control for multiple TCP flows in accordance with an illustrative embodiment.

With reference to FIG. 8, this figure depicts a flowchart of an example process for virtual switch-based congestion control for multiple TCP flows in accordance with an illustrative embodiment. Process 800 can be implemented in any of application 105 in FIG. 1, application 406 in FIG. 4, application 506 in FIG. 5, application 606 in FIG. 6, or application 706 in FIG. 7.

The application executes at a vSwitch in a datacenter host and receives a set of flows from a set of VMs executing on the host (block 802). The application detects a congestion in a flow (block 804). The application makes the detection of block 804 using any of the several methods described herein, or another similarly purposed method that would be conceivable from this disclosure by those of ordinary skill in the art.

The application selects the flow for throttling (block 806). The application determines a path taken by the flow in the datacenter network (block 808). The application makes the determination of block 808 using any of the several methods described herein, or another similarly purposed method that would be conceivable from this disclosure by those of ordinary skill in the art.

Optionally, the application executing at one vSwitch can send a notification about the congestion in the path to another instance of the application executing at another vSwitch, to enable the other instance to perform flow throttling at the other vSwitch (block 809). The application computes an overall throttling amount, i.e., a total CWND reduction to be applied at the vSwitch (block 810).

The application determines whether another flow in the set of flows is using at least a portion of the network path of the flow in which congestion has been detected (block 812). The application makes the determination of block 812 using any of the several methods described herein, or another similarly purposed method that would be conceivable from this disclosure by those of ordinary skill in the art.

Figure 11:
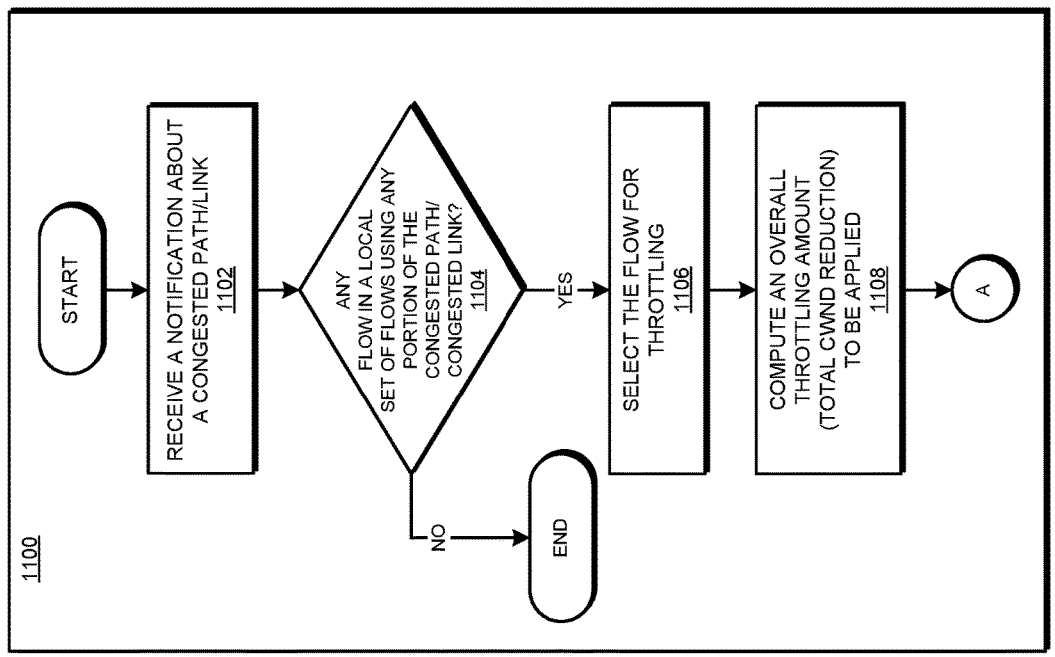
FIG. 11 depicts a flowchart of an example process for flow throttling via inter-vSwitch notification in accordance with an illustrative embodiment.

Additionally, portions of process 800 can be invoked from another process, e.g., from process 1100 in FIG. 11, in response to receiving a notification about path congestion detected at another vSwitch. In such a case, the other process, e.g., process 1100 in FIG. 11, enters process 800 at block 812 via entry point marked A.

If another flow in the set of flows is using at least a portion of the network path of the flow in which congestion has been detected ("Yes" path of block 812), the application selects that flow for throttling as well (block 814). The application then proceeds to block 816. If no other flow in the set of flows is using at least a portion of the network path of the flow in which congestion has been detected ("No" path of block 812), the application proceeds to block 816.

The application determines if more flows remain in the set to be evaluated by block 812 (block 816). If more flows remain in the set to be evaluated by block 812 ("Yes" path of block 816), the application returns to block 812. If no more flows remain in the set to be evaluated by block 812 ("No" path of block 816), the application selects a distribution method to distribute the total CWND reduction across all the selected flows (block 818). For the distribution of block 818, the application selects any of the several methods described herein, or another similarly purposed method that would be conceivable from this disclosure by those of ordinary skill in the art.

For each selected flow, the application performs block 820. Specifically, in block 820, for a selected flow, the application computes a portion of the total CWND reduction that is applicable to the selected flow (block 822). The application makes the determination of block 822 using any of the several methods described herein, or another similarly purposed method that would be conceivable from this disclosure by those of ordinary skill in the art.

The application takes one of two alternative paths from block 822. The application can take different paths for different selected flows within the scope of the illustrative embodiments.

In a first alternative path, which represents one method for adjusting a CWND of a selected flow, the application reduces the CWND of the flow at the vSwitch by the computed portion of the CWND applicable to the selected flow, e.g., as depicted in FIG. 5 (block 824). The application ends process 800 thereafter.

In a second alternative path, which represents another method for adjusting a CWND of a selected flow, the application communicates a new and reduced CWND to the VM corresponding to the selected flow, e.g., as depicted in FIG. 7 (block 826). The application ends process 800 thereafter.

Figure 9:
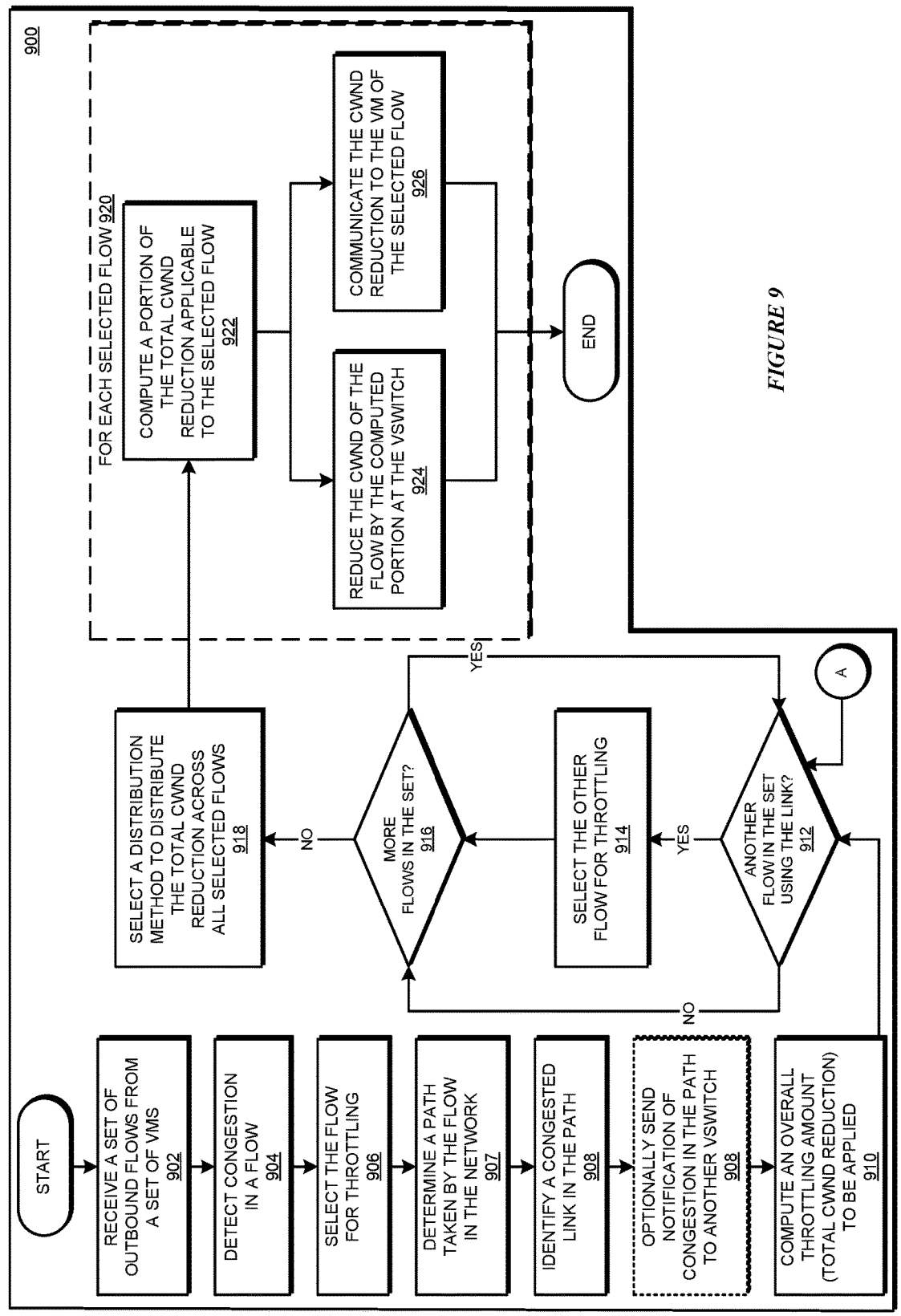
FIG. 9 depicts a flowchart of another example process for virtual switch-based congestion control for multiple TCP flows in accordance with an illustrative embodiment.

With reference to FIG. 9, this figure depicts a flowchart of another example process for virtual switch-based congestion control for multiple TCP flows in accordance with an illustrative embodiment. Process 900 can be implemented in any of application 105 in FIG. 1, application 406 in FIG. 4, application 506 in FIG. 5, application 606 in FIG. 6, or application 706 in FIG. 7.

The application executes at a vSwitch in a datacenter host and receives a set of flows from a set of VMs executing on the host (block 902). The application detects a congestion in a flow (block 904). The application makes the detection of block 904 using any of the several methods described herein, or another similarly purposed method that would be conceivable from this disclosure by those of ordinary skill in the art.

The application selects the flow for throttling (block 906). The application determines a path taken by the flow in the datacenter network (block 907). The application makes the determination of block 907 using any of the several methods described herein, or another similarly purposed method that would be conceivable from this disclosure by those of ordinary skill in the art.

The application identifies a congested link that is causing the congestion (block 908). Optionally, the application executing at one vSwitch can send a notification about the congestion in the link to another instance of the application executing at another vSwitch, to enable the other instance to perform flow throttling at the other vSwitch (block 909). The application computes an overall throttling amount, i.e., a total CWND reduction to be applied at the vSwitch (block 910).

The application determines whether another flow in the set of flows is using the congested link identified in block 909 (block 912). The application makes the determination of block 912 using any of the several methods described herein, or another similarly purposed method that would be conceivable from this disclosure by those of ordinary skill in the art.

Additionally, portions of process 900 can be invoked from another process, e.g., from process 1100 in FIG. 11, in response to receiving a notification about path congestion detected at another vSwitch. In such a case, the other process, e.g., process 1100 in FIG. 11, enters process 900 at block 912 via entry point marked A.

If another flow in the set of flows is using the congested link ("Yes" path of block 912), the application selects that flow for throttling as well (block 914). The application then proceeds to block 916. If no other flow in the set of flows is using the congested link ("No" path of block 912), the application proceeds to block 916.

The application determines if more flows remain in the set to be evaluated by block 912 (block 916). If more flows remain in the set to be evaluated by block 912 ("Yes" path of block 916), the application returns to block 912. If no more flows remain in the set to be evaluated by block 912 ("No" path of block 916), the application selects a distribution method to distribute the total CWND reduction across all the selected flows (block 918). For the distribution of block 918, the application selects any of the several methods described herein, or another similarly purposed method that would be conceivable from this disclosure by those of ordinary skill in the art.

For each selected flow, the application performs block 920. Specifically, in block 920, for a selected flow, the application computes a portion of the total CWND reduction that is applicable to the selected flow (block 922). The application makes the determination of block 922 using any of the several methods described herein, or another similarly purposed method that would be conceivable from this disclosure by those of ordinary skill in the art.

The application takes one of two alternative paths from block 922. The application can take different paths for different selected flows within the scope of the illustrative embodiments.

In a first alternative path, which represents one method for adjusting a CWND of a selected flow, the application reduces the CWND of the flow at the vSwitch by the computed portion of the CWND applicable to the selected flow, e.g., as depicted in FIG. 6 (block 924). The application ends process 900 thereafter.

In a second alternative path, which represents another method for adjusting a CWND of a selected flow, the application communicates a new and reduced CWND to the VM corresponding to the selected flow, e.g., as depicted in FIG. 7 (block 926). The application ends process 900 thereafter.

Figure 10:
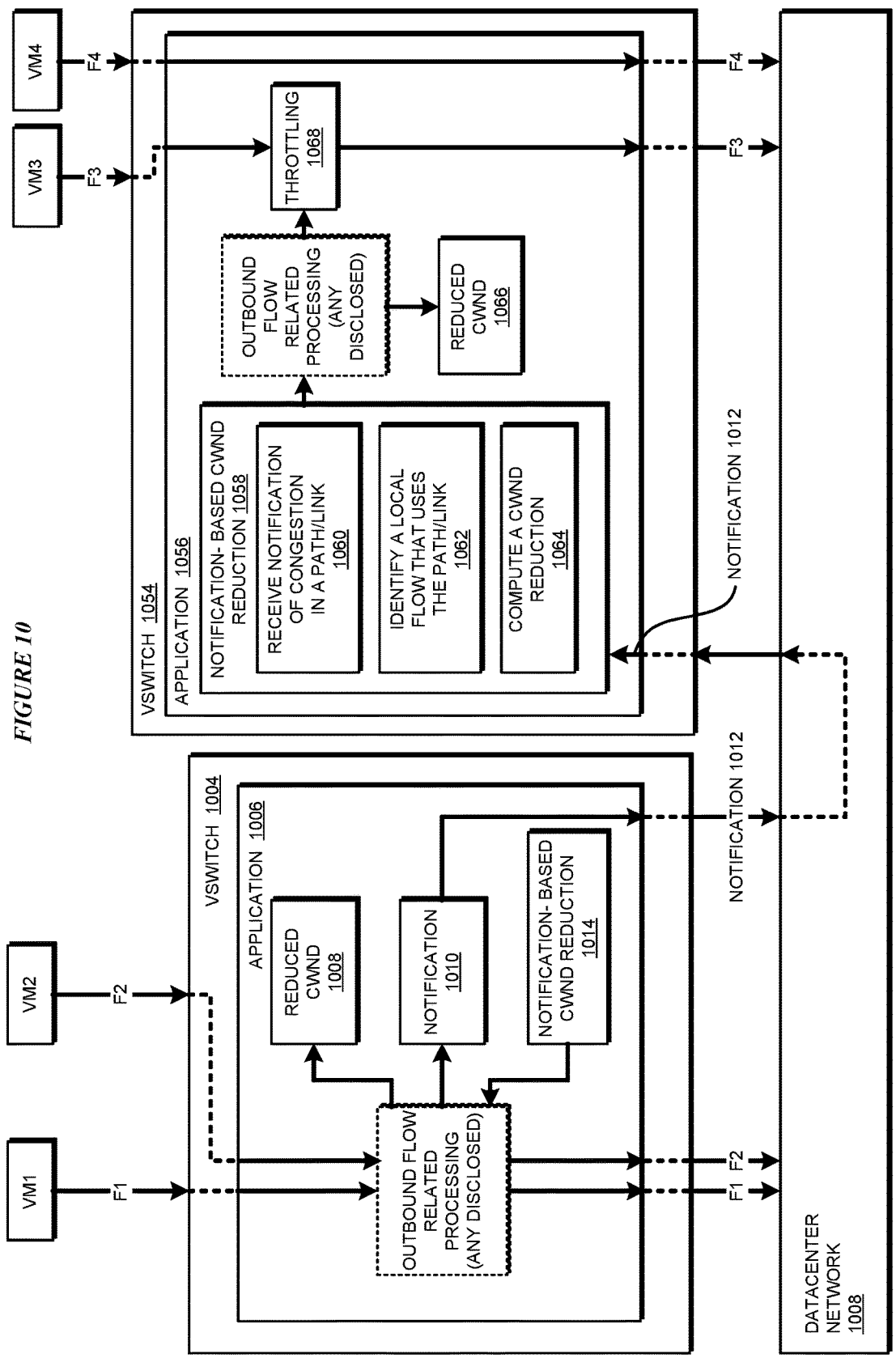
FIG. 10 depicts a block diagram for enabling flow throttling via inter-vSwitch notification in accordance with an illustrative embodiment.

With reference to FIG. 10, this figure depicts a block diagram for enabling flow throttling via inter-vSwitch notification in accordance with an illustrative embodiment. vSwitches 1004 and 1054 are each an example of vSwitch 504 in FIG. 5 or vSwitch 604 in FIG. 6. Application 1006 and 1056 are each an example of application 506 in FIG. 5 or application 606 in FIG. 6. Datacenter network 1008 is an example of datacenter network 508 in FIG. 5 or datacenter network 608 in FIG. 6.

Application 1006 performs outbound flow related processing on local flows F1 and F2 from VM1 and VM2, respectively, using any of the methods described herein. Application 1056 performs outbound flow related processing on local flows F3 and F4 from VM3 and VM4, respectively, using any of the methods described herein.

As a non-limiting example, suppose that the outbound processing of application 1006 detects a congestion in a path or a link used by F1, F2, or both. Application 1006 produces reduced CWND 1008 that may be applicable to F1, F2, or both, as the path or link sharing case may be between F1 and F2, as described herein.

Component 1010 generates notification 1012 and communicates to application 1056 executing in vSwitch 1054 over datacenter network 1008. A copy of component 1010 (not shown) may also be optionally configured in application 1056, if application 1056 is to be configured for providing notifications as well. Notification 1012 informs vSwitch 1054 that vSwitch 1004 detected congestion in a path or a link used by a local flow of vSwitch 1004. Notification 1012 can be constructed according to any suitable specification, and propagated from vSwitch 1004 to vSwitch 1054 in any suitable manner.

Component 1058 operates on notification 1012 in application 1056 in vSwitch 1054. Application 1006 in vSwitch 1004 also has component 1014, which is an equivalent of component 1058. In a manner similar to the processing performed by component 1058 at vSwitch 1054, component 1014 would process at vSwitch 1004 other notifications (not shown) similar to notification 1012, if they are sent (not shown) by other vSwitches in a similar manner.

Subcomponent 1060 receives notification 1012 from datacenter network 1008. Subcomponent 1062 identifies a local flow that uses a portion of the path, or the link, that its reported congested in notification 1012.

If subcomponent 1062 finds that a subset of the local flows, e.g., flow F3, is using at least a portion of a reported path, or a reported link, subcomponent 1062 triggers outbound flow related processing in application 1056, using any method described herein. Subcomponent 1064 computes reduced CWND that may be applicable to the subset of such flows at vSwitch 1054.

The outbound flow related processing in application 1056 applies throttling 1068 to the subset of local flows, e.g., to flow F3, according to reduced CWND 1066. In the depicted example, F4 does not use at least a portion of a reported path, or a reported link, and is therefore not throttled.

With reference to FIG. 11, this figure depicts a flowchart of an example process for flow throttling via inter-vSwitch notification in accordance with an illustrative embodiment. Process 1100 can be implemented in application 1006 or 1056 in FIG. 10.

The application receives a notification about a congested path or a congested link, as the case may be (block 1102). The application determines whether a flow in a set of local flows use any portion of the reported congested path, or the reported congested link (block 1104). If no flow in the set of local flows use any portion of the reported congested path, or the reported congested link ("No" path of block 1104), the application ends process 1100 thereafter.

If a flow in the set of local flows use any portion of the reported congested path, or the reported congested link ("Yes" path of block 1104), the application selects the flow for throttling (block 1106). The application computes an overall throttling amount to be applied at the vSwitch where the application is executing (block 1108). Thereafter, the application exits process 1100 at exit point "A" to enter another process, such as process 800 in FIG. 8 or process 900 in FIG. 9, as the case may be, at entry point marked "A" in those processes. For example, if the notification is about a congested path, the application enters process 800 at entry point marked "A" therein, and executes process 800 thereafter to end. If the notification is about a congested link, the application enters process 900 at entry point marked "A" therein, and executes process 900 thereafter to end.

Thus, a computer implemented method, system or apparatus, and computer program product are provided in the illustrative embodiments for virtual switch-based congestion control for multiple TCP flows and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    selecting, at an application executing in conjunction with a virtual switch (vSwitch) in a host system, using a processor assigned to the vSwitch in the host system, a first flow from a first virtual machine (VM) for throttling;
    selecting, at the application, a second flow for throttling, the second flow using a portion of a network path used by the first flow in a data network;
    distributing, at the application, a total congestion window (CWND) adjustment to the first flow and the second flow; and
    adjusting a first CWND value associated with the first flow by a first portion of the total CWND window, and a second CWND value associated with the second flow by a second portion of the total CWND window.

2. The method of claim 1, further comprising:
    dividing, as a part of the distributing, the total CWND adjustment such that the first portion and the second portion are substantially equal.

3. The method of claim 1, further comprising:
    computing, as a part of the distributing, a fraction such that the first portion adjusts a previous first CWND of the first flow by the fraction and the second portion adjusts a previous second CWND of the second flow by the fraction.

4. The method of claim 1, further comprising:
computing, as a part of the distributing, the first portion as a function of a flow parameter of the first flow; and
computing, as a part of the distributing, the second portion as a function of a flow parameter of the second flow.

5. The method of claim 4, wherein the flow parameter of the first flow is a bandwidth used by the first flow, and wherein the flow parameter of the second flow is a bandwidth used by the second flow.

6. The method of claim 1, wherein the total CWND adjustment is sufficient to reduce a congestion in the network path to below a threshold level of congestion.

7. The method of claim 1, wherein the second flow is from a second VM coupled with the vSwitch.

8. The method of claim 1, further comprising: identifying a link in the network path used by the first flow, wherein the link is congested.

9. The method of claim 8, wherein the portion is the link.

10. The method of claim 1, further comprising:
computing, as a result of the distributing and the adjusting, at the application, a reduced first CWND value associated with the first flow and a reduced second CWND value associated with the second flow by a second portion of the total CWND window.

11. The method of claim 10, further comprising:
receiving a response packet responsive to a packet sent in the first flow;
replacing a receiver advertised window (RWND) value in the response packet with the reduced first CWND value, the replacing forming a modified response packet; and
sending the modified response packet to the first VM.

12. The method of claim 10, further comprising:
receiving in the second flow a number of packets;
dropping, at the application, to form a throttled second flow, responsive to the number of packets exceeding the reduced second CWND value, a second number of packets from the second flow, the second number being obtained by subtracting the reduced second CWND value from the number; and
transmitting to the data network the throttled second flow.

13. The method of claim 1, further comprising:
computing, as a part of determining that the first flow is congested, that a delay in receiving a response packet responsive to a packet sent in the first flow exceeds a threshold delay.

14. The method of claim 1, further comprising:
detecting, as a part of determining that the first flow is congested, that a packet sent in the first flow has been lost.

15. The method of claim 1, further comprising:
sending a notification to a second vSwitch, the notification informing the second vSwitch about the congestion in the network path;
causing, responsive to the sending, at the second vSwitch, a selection of a third flow for throttling at the second vSwitch, the third flow flowing through the second vSwitch, and the third flow being added to a second subset of a second set of flows flowing through the second vSwitch;
causing, responsive to the selection of the third flow at the second vSwitch, a computation of a second total CWND adjustment applicable to the second subset of flows; and causing, at the second vSwitch, an adjusting of a third CWND value associated with the third flow by a third portion of the second total CWND window.

16. The method of claim 15, further comprising:
causing, at the second vSwitch, the selection of the third flow responsive to a determination that the third flow uses at least a portion of the network path in which the notification informs of congestion.

17. A computer usable program product comprising a computer readable storage device including computer usable code, the computer usable code when executed using a processor performing operations, the operations comprising:
selecting, at an application executing in conjunction with a virtual switch (vSwitch) in a host system, using a processor assigned to the vSwitch in the host system, a first flow from a first virtual machine (VM) for throttling;
selecting, at the application, a second flow for throttling, the second flow using a portion of a network path used by the first flow in a data network;
distributing, at the application, a total congestion window (CWND) adjustment to the first flow and the second flow; and
adjusting a first CWND value associated with the first flow by a first portion of the total CWND window, and a second CWND value associated with the second flow by a second portion of the total CWND window.

18. The computer usable program product of claim 17, wherein the computer usable code is stored in a computer readable storage device in a data processing system, and wherein the computer usable code is transferred over a network from a remote data processing system.

19. The computer usable program product of claim 17, wherein the computer usable code is stored in a computer readable storage device in a server data processing system, and wherein the computer usable code is downloaded over a network to a remote data processing system for use in a computer readable storage device associated with the remote data processing system.

20. A data processing system comprising:
a storage device, wherein the storage device stores computer usable program code; and
a processor, wherein the processor executes the computer usable program code, and wherein the computer usable program code comprises:
computer usable code for selecting, at an application executing in conjunction with a virtual switch (vSwitch) in a host system, using a processor assigned to the vSwitch in the host system, a first flow from a first virtual machine (VM) for throttling;
computer usable code for selecting, at the application, a second flow for throttling, the second flow using a portion of a network path used by the first flow in a data network;
computer usable code for distributing, at the application, a total congestion window (CWND) adjustment to the first flow and the second flow; and
computer usable code for adjusting a first CWND value associated with the first flow by a first portion of the total CWND window, and a second CWND value associated with the second flow by a second portion of the total CWND window.

* * * * *